(12) United States Patent
Benkreira et al.

(10) Patent No.: US 11,127,023 B2
(45) Date of Patent: Sep. 21, 2021

(54) SYSTEM FOR PREDICTING OPTIMAL OPERATING HOURS FOR MERCHANTS

(71) Applicant: Capital One Services, LLC, McLean, VA (US)

(72) Inventors: Abdelkader Benkreira, New York, NY (US); Michael Mossoba, Arlington, VA (US); Ljubica Chatman, New York, NY (US); Tyler Maiman, Melville, NY (US); Joshua Edwards, Philadelphia, PA (US)

(73) Assignee: Capital One Service, LLC, McLean, VA (US)

( * ) Notice: Subject to any disclaimer, the term of this patent is extended or adjusted under 35 U.S.C. 154(b) by 0 days.

(21) Appl. No.: 16/524,835

(22) Filed: Jul. 29, 2019

(65) Prior Publication Data

US 2021/0035128 A1 Feb. 4, 2021

(51) Int. Cl.
*G06Q 30/02* (2012.01)
*G06N 20/00* (2019.01)
*G06N 5/04* (2006.01)

(52) U.S. Cl.
CPC .......... *G06Q 30/0202* (2013.01); *G06N 5/04* (2013.01); *G06N 20/00* (2019.01); *G06Q 30/0205* (2013.01)

(58) Field of Classification Search
None
See application file for complete search history.

(56) References Cited

U.S. PATENT DOCUMENTS

| 8,868,522 | B1* | 10/2014 | Zennaro | G06F 16/29 |
| | | | | 707/694 |
| 9,898,788 | B1* | 2/2018 | Calargun | G06Q 30/0635 |
| 2005/0197954 | A1 | 9/2005 | Maitland et al. | |
| 2008/0140515 | A1* | 6/2008 | Godwin | G06Q 10/06 |
| | | | | 705/7.24 |

(Continued)

OTHER PUBLICATIONS

Felker Kaufman, et al. "A New Look at One-Stop Shopping: A Times Model Approach to Matching Store Hours and Shopper Schedules." The Journal of Consumer Marketing, vol. 13, No. 1, p. 4, 1996.*

(Continued)

*Primary Examiner* — Susanna M. Diaz
(74) *Attorney, Agent, or Firm* — Bookoff McAndrews, PLLC

(57) ABSTRACT

Systems and methods relate to predicting improved operating hours for a merchant. For example, a method may include determining operating hours of a target merchant; identifying one or more merchants other than the target merchant having one or more common characteristics with the target merchant; obtaining transactional data indicating customer transactions at the one or more merchants other than the target merchant; computing an estimate of potential customer transactions at the target merchant during a the period of time not within the operating hours by processing input data including the obtained transactional data using a trained machine learning model to produce the estimate, the estimate being a number or value of consumer transactions missed as a result of the target merchant being closed during the period of time; and transmitting, to the target merchant, information indicating the computed estimate.

18 Claims, 5 Drawing Sheets

(56) References Cited

U.S. PATENT DOCUMENTS

| | | | | |
|---|---|---|---|---|
| 2009/0304174 | A1* | 12/2009 | Yamanaka | H04M 3/36 |
| | | | | 379/266.1 |
| 2009/0319348 | A1* | 12/2009 | Khosravy | G01C 21/20 |
| | | | | 705/14.1 |
| 2010/0121567 | A1* | 5/2010 | Mendelson | G01C 21/206 |
| | | | | 701/467 |
| 2011/0022467 | A1* | 1/2011 | Carney, II | G06Q 30/00 |
| | | | | 705/14.58 |
| 2011/0264502 | A1* | 10/2011 | Taylor | G06Q 20/20 |
| | | | | 705/14.25 |
| 2012/0161967 | A1* | 6/2012 | Stern | G06K 7/10366 |
| | | | | 340/572.1 |
| 2013/0024368 | A1* | 1/2013 | Scammell | G06Q 20/14 |
| | | | | 705/40 |
| 2013/0046603 | A1* | 2/2013 | Grigg | G06Q 30/0261 |
| | | | | 705/14.25 |
| 2013/0275186 | A1* | 10/2013 | Olives | G06Q 10/06393 |
| | | | | 705/7.39 |
| 2014/0136443 | A1* | 5/2014 | Kinsey, II | G06Q 10/063116 |
| | | | | 705/347 |
| 2014/0188568 | A1* | 7/2014 | Margolin | G06Q 10/0637 |
| | | | | 705/7.36 |
| 2014/0337107 | A1* | 11/2014 | Foster | G06Q 10/06395 |
| | | | | 705/7.41 |
| 2015/0310460 | A1* | 10/2015 | Tesanovic | H04W 4/029 |
| | | | | 705/7.31 |
| 2015/0379531 | A1* | 12/2015 | Christian | G06Q 30/0202 |
| | | | | 705/7.31 |
| 2016/0188769 | A1* | 6/2016 | Aylott | G09B 25/02 |
| | | | | 703/6 |
| 2016/0239857 | A1 | 8/2016 | Milton et al. | |
| 2016/0350596 | A1* | 12/2016 | Bataller | G06T 7/80 |
| 2017/0177723 | A1* | 6/2017 | Price | H04W 4/30 |
| 2017/0262784 | A1* | 9/2017 | Lowery | G06Q 10/063114 |
| 2017/0337591 | A1* | 11/2017 | Ali | G06Q 30/0269 |
| 2018/0205751 | A1* | 7/2018 | Howie | H04L 63/1425 |
| 2018/0268339 | A1* | 9/2018 | Malchev | G06F 17/5009 |
| 2018/0308018 | A1 | 10/2018 | Bansal et al. | |

OTHER PUBLICATIONS

Wenzel, Tobias. "Deregulation of Shopping Hours: The Impact of Independent Retailers and Chain Stores." The Scandinavian Journal of Economics, vol. 113, No. 1, pp. 145-166, 2011.*

Shy, et al. "Price Competition, Business Hours, and Shopping Time Flexibility." Apr. 28, 2007. Retrieved from Internet [URL: http://citeseerx.ist.psu.edu].*

* cited by examiner

SYSTEM FOR PREDICTING OPTIMAL OPERATING HOURS FOR MERCHANTS

TECHNICAL FIELD

Various embodiments of the present disclosure relate generally to assessment of operating hours of a merchant, and, more particularly, to predicting optimal or improved operating hours for a merchant.

BACKGROUND

Merchants, such as stores that sell products to customers, are faced with the task of optimizing their operating hours in order to maximize profit. Merchants may use their own information on revenue and operating costs to evaluate whether certain portions of their current operating hours are not profitable. However, merchants may have difficulty assessing whether it would be worthwhile to extend their operating hours to hours that are not within their current operating hours, since sales data is not available for hours when the merchant is closed.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for predicting improved operating hours for a merchant.

For instance, a method may include determining operating hours of a target merchant; identifying one or more merchants other than the target merchant having one or more common characteristics with the target merchant; obtaining transactional data indicating customer transactions at the one or more merchants other than the target merchant, the customer transactions including customer transactions during a period of time not within the operating hours; computing an estimate of potential customer transactions at the target merchant during a the period of time not within the operating hours by processing input data including the obtained transactional data using a trained machine learning model to produce the estimate, the estimate being a number or value of consumer transactions missed as a result of the target merchant being closed during the period of time; and transmitting, to the target merchant, information indicating the computed estimate.

Furthermore, a computer system may include a memory storing instructions; and one or more processors configured to execute the instructions to perform operations. The operations may include determining operating hours of a target merchant; identifying one or more merchants other than the target merchant having one or more common characteristics with the target merchant; obtaining transactional data indicating customer transactions at the one or more merchants other than the target merchant, the customer transactions including customer transactions during a period of time not within the operating hours; by using a trained machine learning model, computing an estimate of potential customer transactions at the target merchant during the period of time not within the operating hours based on input data including the transactional data, and determining one or more operating recommendations, the estimate being a number or value of consumer transactions missed as a result of the target merchant being closed during the period of time, the one or more operating recommendations including a recommendation regarding an adjustment to the operating hours based on the computed estimate; and transmitting, to the target merchant, information indicating the determined one or more operating recommendations.

Furthermore, a computer system for predicting improved operating hours for a merchant may include a memory storing instructions; and one or more processors configured to execute the instructions to perform operations. The operations may include receiving, from a target merchant over a computer network, information indicating operating hours of the target merchant and one or more characteristics of the target merchant; selecting one or more merchants, other than the target merchant, based on the received characteristics of the target merchant; obtaining transactional data indicating customer transactions at the one or more merchants other than the target merchant; selecting a period of time not within the operating hours; computing an estimate of potential customer transactions at the target merchant during the selected period of time, by processing the obtained transactional data using a trained machine learning model, the estimate being a number or value of consumer transactions missed as a result of the target merchant being closed during the period of time; and transmitting, to the target merchant over the computer network, a recommendation regarding an adjustment to the operating hours generated based on the computed estimate.

According to additional aspects of the disclosure, a non-transitory computer-readable medium stores instructions that, when executed by one or more processors, cause the one or more processors to perform the aforementioned computer-implemented method or the operations that the aforementioned computer systems are configured to perform.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as transactional data may be used to estimate potential customer transactions at a merchant during a period of time not within the operating hours. This estimate may be used by the merchant to optimize or improve its operating hours, and/or may be used to generate one or more recommendations suggesting an adjustment of operating hours.

Figure 1:
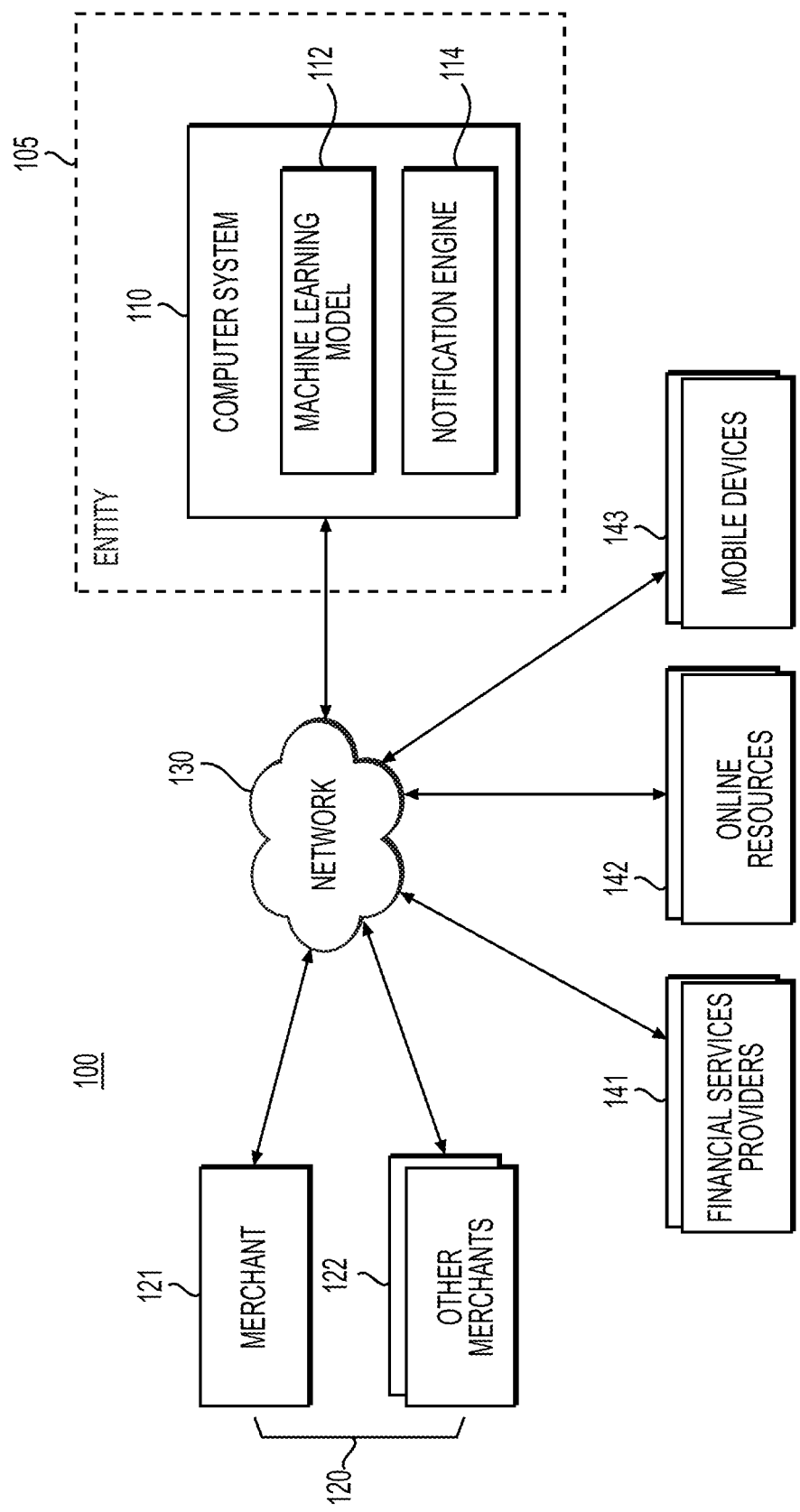
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, merchants 120, financial services providers 141, online resources 142, and mobile devices 143. These components may be connected to one another by a network 130.

The computer system 110 may have one or more processors configured to perform methods described in this disclosure. Merchant 121 may be referred to as a "target merchant," which is used to refer to a merchant whose operating hours are to be evaluated by the computer system 110. The computer system 110 may include a machine learning model 112 and a notification engine 114, which may each be software components stored in the computer system 110. The computer system 110 may be configured to utilize the machine learning model 112 and/or notification engine 114 when performing various methods described in this disclosure. Machine learning model 112 may be a plurality of machine learning models.

In some examples, the computer system 110 may have a cloud computing platform with scalable resources for computation and/or data storage, and may run one or more applications on the cloud computing platform to perform various computer-implemented methods described in this disclosure.

Computer system 110 may be configured to receive data from other components (e.g., merchants 120, financial services providers 141, online resources 142, and/or mobile devices 143) of the system environment 100 through network 130. Computer system 110 may further be configured to utilize the received data by inputting the received data into the machine learning model 112 to produce a result. Information indicating the result may be transmitted to target merchant 121 over the network 130. In some examples, the computer system 110 may be referred to as a server system that provides a service including providing the information indicating the result to merchant 121. Additionally, a computing device of the target merchant 121 may operate a client program, also referred to as a merchant application, used to communicate with the computer system 110. This merchant application may be used to provide information to the computer system 110 and to receive information from the computer system 110. In some examples, the merchant application may be a mobile application that is run on a mobile device (e.g., mobile device 143) operated by target merchant 121.

Merchants 120 may each be an entity that provides products. In this disclosure, the term "product," in the context of products offered by a merchant, encompasses both goods and services, as well as products that are a combination of goods and services. A merchant may be, for example, a retailer, a grocery store, an entertainment venue, a service provider, a restaurant, a bar, a non-profit organization, or other type of entity that provides products that a consumer may consume. A merchant 120 may have one or more venues that a consumer physically visits in order to obtain the products (goods or services) offered by the merchant. In this context, a venue may be a facility such as a "brick-and-mortar" store.

Network 130 may be any suitable network or combination of networks and may support any appropriate protocol suitable for communication of data to and from the computer system 110 and between various other components in the system environment 100. Network 130 may include a public network (e.g., the internet), a private network (e.g., a network within an organization), or a combination of public and/or private networks.

Financial services providers 141 may be an entity such as a bank, credit card issuer, merchant services providers, or other type of financial service entity. In some examples, financial services providers 141 may include one or more merchant services providers that provide merchants 120 with the ability to accept electronic payments, such as payments using credit cards and debit cards. Therefore, financial services providers 141 may collect and store transactional data pertaining to consumer transactions occurring at the merchants 120.

The merchants 120 and financial services providers 141 may each include one or more computer systems configured to gather, process, transmit, and/or receive data. In general, whenever any of the merchants 120 and financial services providers 141 is described as performing an operation of gathering, processing, transmitting, or receiving data, it is understand that such operation may be performed by a computer system thereof. In general, a computer system may include one or more computing devices, as described in connection with FIG. 5, below. Online resources 142 may include other computer systems, such as web servers, that are accessible by computer system 110. Such sources may provide information, such as weather data.

Mobile devices 143 may each be a computer system. Examples of mobile devices 143 may include smartphones, wearable computing devices, tablet computers, and vehicle computer systems. Mobile devices 143 may be capable of transmitting information indicating a current location of the device. For example, mobile devices 143 may have an application configured to transmit data indicating a current location of the mobile device 143 to computer system 110. The mobile devices 143 may determine its location based on data obtained by a GPS included in the mobile device 143 and/or other location estimation techniques.

Computer system 110 may be part of entity 105, which may any type of company, organization, or institution. In some examples, the entity 105 may be a financial services provider. In such examples, the computer system 110 may have access to data pertaining to consumer transactions through a private network within the entity 105. For example if the entity 105 is a card issuer, entity 105 may collect and store transactions involving a credit card or debit card issued by the entity 105. In such examples, the computer system 110 may still receive transactional data from other financial services providers 141.

Figure 2:
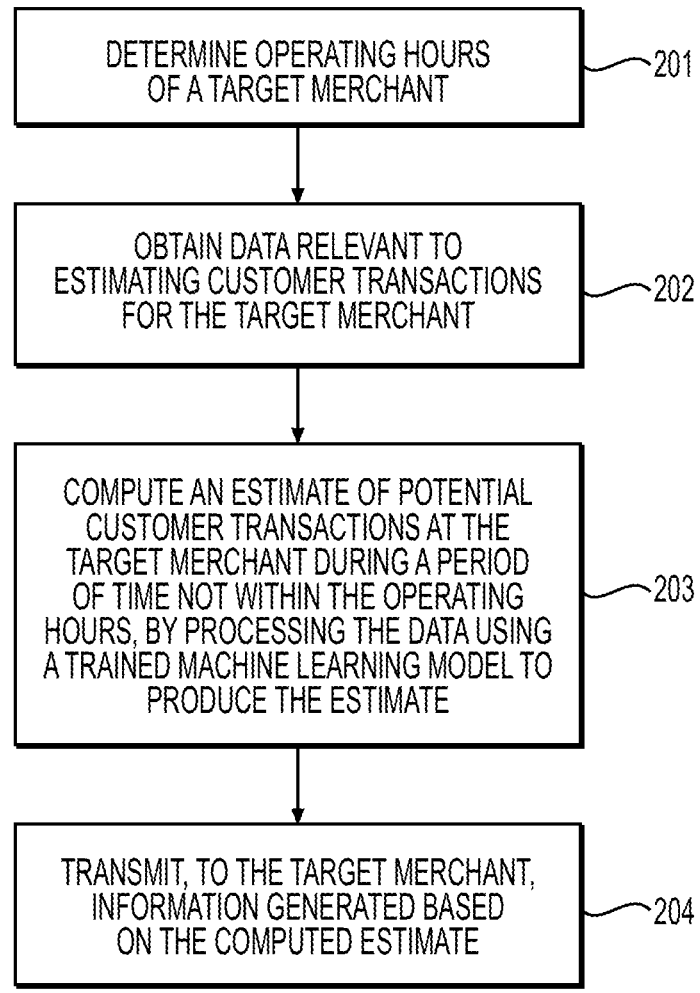
FIG. 2 depicts a flowchart of an exemplary method of predicting improved operating hours for a merchant, according to one or more embodiments.

FIG. 2 is a flowchart illustrating a method for predicting improved operating hours of a target merchant 121, according to one or more embodiments of the present disclosure. The method may be performed by computer system 110. For purposes of illustration, merchant 121 is used an example of the target merchant, and entity 105, operating the computer system 110, is assumed to be a financial services provider.

Step 201 may include determining operating hours of the target merchant 121. The operating hours may be a set of times (e.g., hours or any portion of hours) within a day during which the merchant 121 is open (e.g., open such that customers may purchase products at the merchant). In some examples, the operating hours may include respective operating hours for each day of the week.

In some examples, the operating hours may be determined by receiving information specifying the operating hours, from the target merchant 121. Such information may be communicated to the computer system 110 using, for example, the merchant application described above.

Alternatively or additionally, the operating hours may be determined based on analysis of data available to the computer system 110. For example, the computer system 110 may analyze payment transactions made by customers to the target merchant 121. A cessation of payment transactions at a certain time of day, or during a certain period of time of the day, may be interpreted as indicating that the target merchant 121 has closed during that time. The computer system 110 may obtain transactional data indicating payment transactions involving the target merchant from 121, for example, financial services providers 141 over a financial network. If the entity 105 operating the computer system 110 is a card issuer or other financial services provider that is involved in processing payment transactions, the computer system 110 may have access to such transactional data directly or through a private network within entity 105, and may utilize such information in addition to or alternatively to information from other financial services providers 141. It is noted that the operating hours determined in step 201 may be estimated operating hours that are estimated according to the types of data discussed above.

Step 202 may include obtaining data relevant to estimating customer transactions for the target merchant 121. Such data may include any one or combination of the following: (a) transactional data indicating customer transactions at the target merchant 121; (b) transactional data indicating customer transactions at one or more other merchants 122 relevant to the target merchant 121; (c) data indicating one or more characteristics of the target merchant 121; (d) data indicating one or more characteristics of the one or more other merchants 122 relevant to the target merchant 121; (e) data indicating weather conditions over a period of time or at proximate geographical locations; (f) a schedule of holidays; or (g) data indicating other relevant consumer activity (e.g., consumer traffic in a geographical area of the target merchant 121). It is noted that these categories of information are not necessarily mutually exclusive, and information may belong to multiple categories. A customer transaction may be a purchase of a product by a customer.

Transactional data indicating customer transactions, whether the transactions are at the target merchant 121 or at one or more other merchants 122 relevant to the target merchant 121, may describe payments made by customers using an electronic payment method, such as a credit card. Data describing a customer transaction at a merchant may indicate the amount of a purchase, the time of the purchase, and a location (e.g., venue) of the purchase. Data describing payment transactions at a merchant 120 may be obtained from financial services providers 141, payment processing systems within entity 105, and/or the respective merchants 120. In some examples, data describing payment transactions at the target merchant 121 may be provided by target merchant 121 directly, such as through the merchant application described above.

Figure 3:
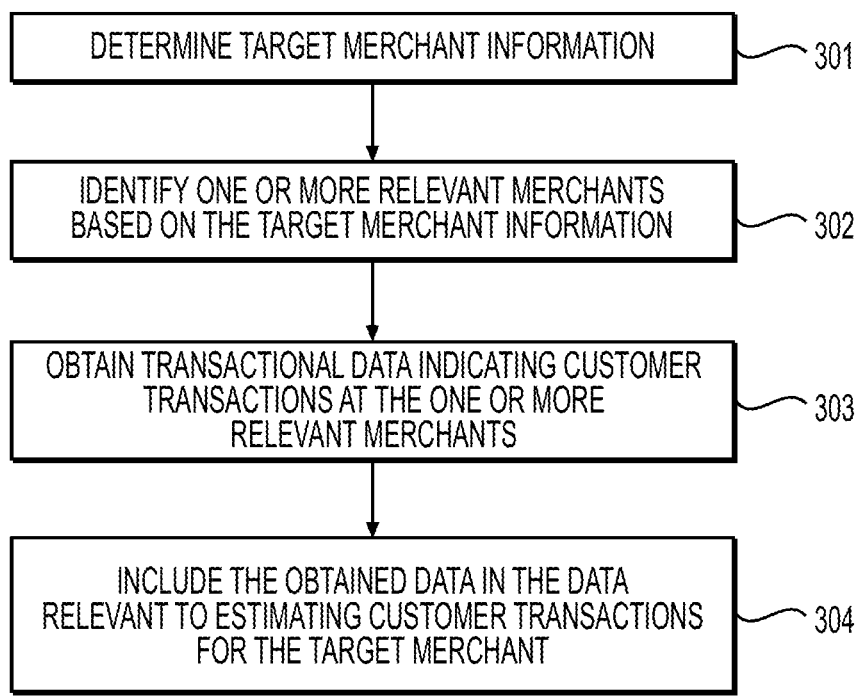
FIG. 3 depicts a flowchart of an exemplary method of identifying data relevant to estimating potential customer transactions for the target merchant.

Merchants relevant to the target merchant 121 may be represented in FIG. 1 as a selected subset of other merchants 122. FIG. 3 is a flowchart illustrating an example of a method that involves identification of relevant merchants so that data indicating customer transactions at the relevant merchants may be obtained as the data in step 202 of FIG. 2. Examples of merchant characteristics are also provided in the following discussion of FIG. 3.

The method illustrated in FIG. 3 may include: determining target merchant information (step 301); identifying one or more relevant merchants based on the target merchant information (step 302); obtaining data indicating customer transactions at the one or more relevant merchants (step 303); and including the obtained data in the data relevant to estimating customer transactions for the target merchant (step 304).

The target merchant information in step 301 may include one or more characteristics of the target merchant 121 and/or characteristics of a geographical location of the target merchant 121. In general, characteristics of a merchant (such as the target merchant 121 or other merchants 122) may include characteristic(s) of products offered by the merchant, business operation characteristic(s) of the merchant, customer demographics, and a geographical location of the merchant. In this context, the geographical location of a merchant may be understood as the geographical location of one or more venues of the merchant. A geographical location may be a specific geographical location (e.g., an address or coordinate position), or a region, area, city, neighborhood or locality in which one or more venues of the merchant is located. Examples of characteristics of the geographical location include: an urbanization classification of the location (e.g., urban, suburban, or rural); the type(s) of land use or land development in the location (e.g., corporate, residential, commercial, cultural, institutional, entertainment, or mixed use); and any other characteristic of the economic environment of the merchant, such as population density, demographic characteristics, climate, etc. The characteristics of the geographical location may be for the entire geographical location (if the geographical location is a region, area, city, or locality) or an area defined based on the geographical location, such as an area within a certain geographical distance from the geographical location.

Step 302 may include identifying, from a base set of merchants, one or more relevant merchants based on satisfaction of one or more selection criteria pertaining to relevance to the target merchant 121. In general, a relevant merchant may be selected on the basis that it has one or more characteristics that have some amount of determinative value in estimating potential customer transactions at the target merchant 121. The identification of relevant merchants may be based on an analysis of the merchant information for the merchants in the base set and the target merchant information. Merchant information for a merchant in the base set of merchants may describe the same attributes as any attributes described in the target merchant information. For example, the merchant information may include one or more characteristics of the respective merchant, and one or more characteristics of the geographical location of the respective merchant, in the manner described above for the target merchant. The identities of the base set of merchants and their corresponding merchant information may be stored in a database stored in computer system 110 or otherwise accessible by computer system 110.

In some examples, a merchant in the base set of merchants may be selected as a relevant merchant if it has one or more characteristics in common with or related to the one or more characteristics of the target merchant 121.

For example, a merchant may be identified as relevant to the target merchant 121 if it offers a same type of product as a type of product offered by the target merchant 121. For example, if the target merchant 121 is a board game store, a relevant merchant may be a board game store. In some examples, in order to be identified as relevant to the target merchant 121, a merchant that offers a same type of product as a type of product offered by the target merchant 121 needs to satisfy a condition related to geography. The condition related to geography may be a distance condition. For example, the selection criteria may limit the selection of relevant merchants to those within a certain geographical distance from the geographical location of the target merchant 121, or to a predetermined number of relevant merchants that are closest to the geographical location of the target merchant 121. The condition related to geography may be commonality between the characteristics of the geographical location of the target merchant 121 and the characteristics of the geographical location of the relevant merchants. In such examples, a board game store in a similar location with similar demographical characteristics may also be identified as a relevant merchant.

As another example, a merchant may be identified as relevant to the target merchant 121 if the merchant offers a type of product that is not the same as the type of product offered by the target merchant 121, but is nonetheless related to the type of product offered by the target merchant 121 by being a complement or a substitute to the type of product offered by the target merchant 121. For example, if sandwiches and ice cream are complementary goods in that consumers who consume sandwiches tend to consume ice cream afterwards, then consumer activity at an ice cream shop in the same geographical location as that of a sandwich shop may be relevant to determining an amount of potential customers for the sandwich shop, especially if the ice cream shop is open during times outside of the operating hours of the sandwich shop and customer transactions occurring at such times are available. In some examples, a merchant that offers a complementary or substitute product may also need to satisfy a condition related to geography in order to be identified as a relevant merchant. The above discussion on conditions related to geography are applicable to the instant example.

In step 303, data indicating customer transactions at the one or more relevant merchants may be obtained from the financial services providers 141 or payment processing systems of the entity 105, as discussed above. Transactional data, for the target merchant 121 and the one or more relevant merchants, may include transactional details, such as the amount of the transaction and the timestamp of the transaction, so as to permit an assessment of the frequency and/or number of transactions during a certain period of time. The consumer purchases at the one or more relevant merchants may include purchases taking place at points of time that are not within the operating hours determined in step 201, such as times of a particular day before the target merchant 121 opens and times after the target merchant 121 closes. Additionally, data indicating customer transactions may be indicative of the number of purchases over a certain period of time. In step 304, the obtained data is included in the data relevant to estimating customer transactions for the target merchant.

Returning now to FIG. 2, as discussed above, the data identified in step 202 may additionally or alternatively include data indicating weather, schedule of holidays, and/or other relevant consumer activities. Examples of other relevant consumer activity may include consumer traffic (e.g., foot traffic or vehicle traffic) in a relevant geographical area, and consumer activity involving transportation services (e.g., public transit services, taxi services, or ride-sharing services) in a relevant geographical area. Data indicating weather may be obtained, for example, from online resources 142, and may cover a period of time that is also covered by the transactional data for the target merchant 121 and the one or more relevant merchants. The data indicating weather may be for a relevant location, such as the location of the target merchant and the one or more relevant merchants.

Data indicating foot or vehicle traffic may be obtained from mobile devices 143. For example, the mobile devices 143 may run an application that obtains location data and transmits the location data to computer system 110, or another server for access by the computer system 110. Such an application may, for example, be a banking application for using a banking or payment card service offered by entity 105. The application may provide an option whereby users may share the location of their respective mobile devices 143 in real-time or in intervals over a period of time. Such location data may be used to estimate foot or vehicle traffic of consumers in general, even if the data pertains only to users of the application who have opted to share their location. Additionally or alternatively, data indicating foot or vehicle traffic may also be obtained from online resources 142. For example, certain third party services may gather data on foot or vehicle traffic, and such data may be accessible by computer system 110 over network 130.

Consumer activity involving transportation services (e.g., public transit services, taxi services, or ride-sharing services) in a relevant geographical area may indicate consumer usage of such services, such as the locations traversed by consumers at certain times. Data indicating such activities may be obtained from transportation services.

Step 203 may include computing an estimate of potential customer transactions at the target merchant 121 during a period of time not within the operating hours, by processing the data using a trained machine learning model (e.g., machine learning model 112) to produce the estimate. The estimate may be a quantity of customer transactions missed as a result of the target merchant 121 being closed during the period of time, and/or a value (e.g., a revenue value), of such customer transactions missed.

The machine learning model 112 may be a regression-based model that accepts the data identified in step 202 as input data. The machine learning model 112 may be of any suitable form, and may include, for example, a neural network or deep neural network. The machine learning model 112 may compute the estimate as a function of the period of time and one or more variables indicated in the input data. This function may be learned by training the machine learning model 112 with training sets.

The period of time not within the operating hours may be a period that does not overlap the operating hours, or does not include any portion of the operating hours. In some examples, this period of time may be automatically selected by the computer system 110 or machine learning model 112 based on the operating hours determined in step 201. For example if the operating hours are determined in step 201 to be 8:00 am to 6:30 pm, then the period of time may be selected as, for example, a period of a certain length (e.g., one-hour or half-hour increments) prior to 8:00 AM or after 6:30 PM. In some examples, the computer system 110 or machine learning model 112 may automatically select a plurality of periods of time not within the operating hours. In such examples, the machine learning model 112 may compute a respective estimate of potential customer transactions at the target merchant 121 for each of the plurality of periods of time.

The machine learning model 112 may be trained (prior to its usage in step 203) by supervised, unsupervised or semi-supervised learning using training sets comprising data of types similar to the type of data used as the model input. For example, the training set used to train the model 112 may include any combination of the following: data indicating customer transactions at a set of merchants; data indicating one or more characteristics of merchants in the set of merchants; data indicating characteristics of respective geographical locations of the merchants in the set of merchants; data indicating weather over a period of time; a schedule of holidays; and/or data indicating other relevant consumer activity (e.g., consumer traffic). The characteristics of a respective geographical locations of the merchants in the set of merchants may include urbanization classification of the location (e.g., urban, suburban, or rural); the types of land use or land development in the location (e.g., corporate, residential, commercial, cultural, institutional, entertainment, or mixed use); and/or any other characteristic of economic environments, such as population density, demographic characteristics, climate, etc. The quantity or value of customer transactions at the set of merchants for various periods of time may be expressly indicated in the training set or, alternatively, computable based on the data indicating customer transactions at a certain set of merchants or other data in the training set.

Accordingly, the machine learning model 112 may be trained to map input variables to a quantity or value of customer transactions for a given merchant. That is, the machine learning model 112 may be trained to determine a quantity or value of customer transactions for the target merchant 121 as a function of various input variables. Such input variables may describe customer transactions at the target merchant 121 and other merchants (e.g., the time and amount of purchases), characteristics of the target merchant 121 and the other merchants 122 (e.g., geographical and/or product-related characteristics), weather over a certain period of time; occurrence of holidays, and/or other relevant consumer activity (e.g., consumer traffic and a geographical location of the consumer traffic). The quantity or value of customer transactions determined by the machine learning model 112 may be specific to a period of time, which may be used as an additional input variable.

Step 204 may include transmitting, to the target merchant 121, information generated based on the computed estimate. This information may indicate, for example, the estimate computed in step 203 or a recommendation as to whether the operating hours of the target merchant 121 should be modified based on the estimate. The information may be presented to the target merchant 121 in any suitable form, such as an email, a text message, a push notification, and/or content on a web page. The information may also be presented in the merchant application discussed above.

In some examples, step 204 may occur in response to a trigger condition. For example, the notification engine 114 may detect whether a trigger condition has occurred, and transmit the information to the target merchant 121 upon detecting that the trigger condition has occurred. The trigger condition may be, for example, a passage of a period of time, or a significant change in the estimate computed in step 203 from a previously computed estimate. Such a trigger condition may be used to regulate the frequency at which information is conveyed to the target merchant 121 if, for example, the estimate of potential customer transactions is computed on a regular basis.

Any of the aforementioned data pertaining to individual customers or consumers may be anonymized, such that the information transmitted to the target merchant 121 is not associable with personal identities. Additionally, the computer system 110 may be configured to perform the method of FIG. 2 only when the input data is of the extent that anonymity of individual customers or consumers may be protected. Additionally, step 203 may be repeated for a plurality of periods of time not within the operating hour (e.g., multiple half-hour blocks after the closing time of the merchant), so that an estimate is obtained for each of the plurality of periods of time.

Figure 4:
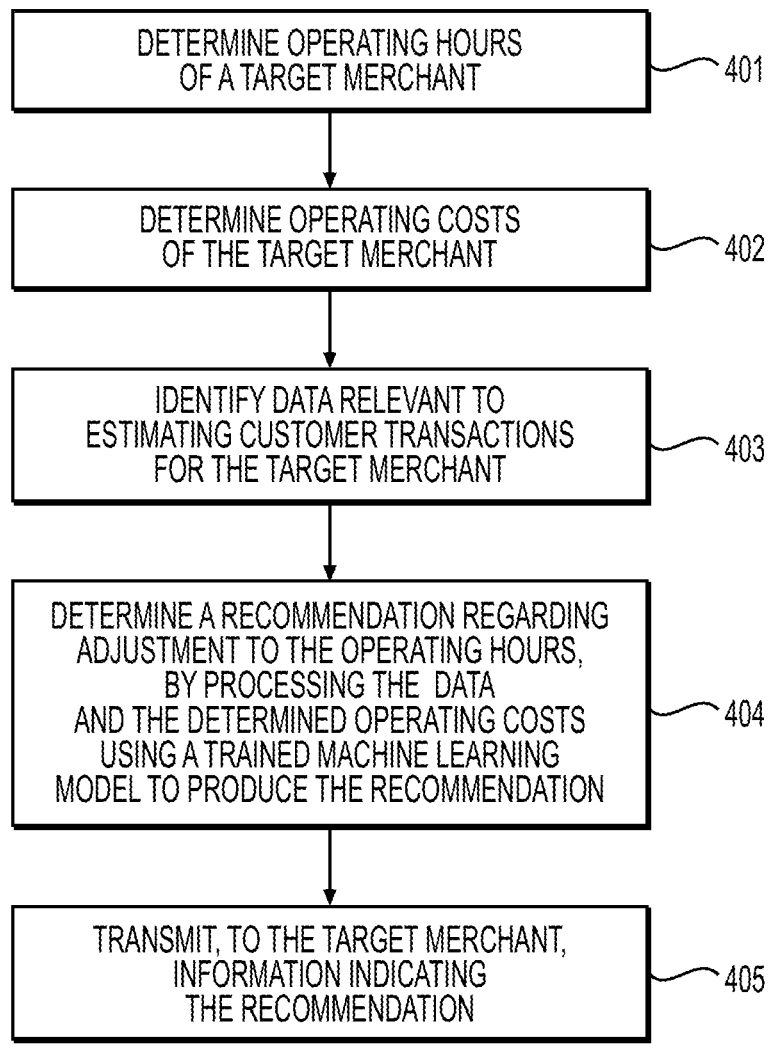
FIG. 4 depicts a flowchart of an exemplary method of predicting improved operating hours for a merchant, according to one or more embodiments.

FIG. 4 is a flowchart illustrating a method for predicting improved operating hours for a target merchant 121. The method may include determining operating hours of a target merchant 121 (step 401); determining operating costs of the target merchant 121 (step 402); identifying data relevant to estimating customer transactions for the target merchant 121(step 403); determining a recommendation regarding adjustment to the operating hours, by processing the data and the determined operating costs using a trained machine learning model 112 to produce the recommendation (step 404); and transmitting, to the target merchant 121, information indicating the recommendation (step 405). Steps 401 and 403 may respectively correspond to steps 201 and 202 of FIG. 2, and may include any of the features discussed for steps 201 and 202, above.

In step 402, the operating costs of the target merchant 121 may be determined based on information provided by the target merchant 121, such as accounting data. Additionally or alternatively, operating costs may be determined from a bank account of the target merchant 121, if the bank account is accessible by the computer system 110. In some examples, the bank account is a service offered by the entity 105 operating the computer system 110.

Step 404 may include step 203 of FIG. 2. As noted in the above discussion of step 203, the machine learning model 112 may compute an estimate of potential transactions at the target merchant 121 during a period of time not within the operating hours. In the embodiment shown in FIG. 4, the machine learning model 112 may additionally determine a recommendation regarding an adjustment to the operating hours of the target merchant 121. This recommendation may be based on the estimate computed in step 203 and the operating costs determined in step 402, and may recommend an extension of the operating hours to include the period of time not within the operating hours computed. The machine learning model 112 may recommend such an extension of the operating hours upon, for example, determining that the estimated value (e.g., revenue value) of the potential transactions during this period of time is sufficiently high as compared to the operating costs for the same period.

In step 405 of FIG. 4, the information indicating the recommendation may further indicate the value of the potential transactions expected to be gained by extending the operating hours and the expected cost associated with extending the operating hours. The information indicating the recommendation may include a message suggesting adjustment of the operating hours of the merchant to include the period of time. The message may indicate that such an adjustment has been determined to be optimal.

In some examples, in addition to determining a recommendation regarding adjustment to the operating hours, the machine learning model 112 may also determine a recommended staffing level. The recommended staffing level may be determined by the machine learning model 112 to be required in order for the target merchant 121 to realize a certain amount of revenue or profit if the operating hours are to be adjusted according to the recommended adjustment to the operating hours. As described above, the recommended adjustment to the operating hours may be an extension of the operating hours to include the additional period of time discussed above. Therefore, the recommended staffing level may be a staffing level that is needed during the additional period of time in order for the target merchant 121 to be profitable, or realize a certain amount of revenue or profit.

The determination of the recommended staffing level and the determination of the recommendation regarding the operating hours may be interrelated. For example, both recommendations may be concurrent outputs of the machine learning model 112 and/or be determined based on common inputs (such as the data and the determined operating costs used in step 403).

The recommendation regarding the staffing level may be communicated by the information transmitted in step 405. The recommendation may be, for example, expressed in categorical terms (e.g., a staffing level that is low, medium, or high), or a quantitative level of staffing (e.g., as a percentage relative to a staffing level during normal operation). In some examples, the machine learning model 112 may calculate the estimate of step 203 of FIG. 2 for a plurality of periods of time not within the operating hours (e.g., multiple half-hour blocks after the closing time of the merchant) and produce a recommendation pertaining to one or all of the plurality of periods of time. For example, the recommendation may suggest an extension of the operating hours to only some of the plurality of periods of time by determining that it is optimal to extend the operating hours through only some of the plurality of periods of time. For example, the machine learning model 112 may have determined that only a few periods of the plurality of periods would provide for profitable operation.

If the target merchant 121 adjusts its operating hours to cover a period of time not within the original operating hours, the customer transactions resulting from the adjustment of the operating hours may be used to refine the machine learning model 112. The customer transactions resulting from the adjustment of the operating hours may be provided by the target merchant 121 to the computer system 110, or estimated by the computer system 110 using transactional data.

According to aspects of the disclosure discussed above, it is possible to estimate potential customer transactions at the target merchant 121 during a period of time not within the operating hours of the target merchant 121. Such estimates may be used to assist merchants in improving their operating hours.

According to a further aspect of the present disclosure, if the target merchant 121 adjusts its operating hours to cover the period of time not within the original operating hours, the computer system, upon determining that the target merchant 121 has made this adjustment, may advertise to consumers that the target merchant 121 is now open for additional/extended hours. Such an advertisement may be part of a subscribed service that is performed by the computer system 110.

According to a further aspect of the present disclosure, transactional data indicating customer transactions at the target merchant 121 and/or at one or more relevant merchants may be used to form an assessment of the frequency and number of transactions for the target merchant 121. This assessment may then be used to predict times at which the target merchant 121 may experience a high number of transactions, which help the target merchant 121 optimize its operations. Such a prediction may be made by the trained machine learning model 112.

In general, any process discussed in this disclosure that is understood to be computer-implementable, such as the processes illustrated in FIGS. 2-4, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, may include one or more computing devices. If the one or more processors of the computer system 110 are implemented as a plurality of processors, the plurality of processors may be included in a single computing device or distributed among a plurality of computing devices. If a computer system 110 comprises a plurality of computing devices, the memory of the computer system 110 may include the respective memory of each computing device of the plurality of computing devices.

Figure 5:
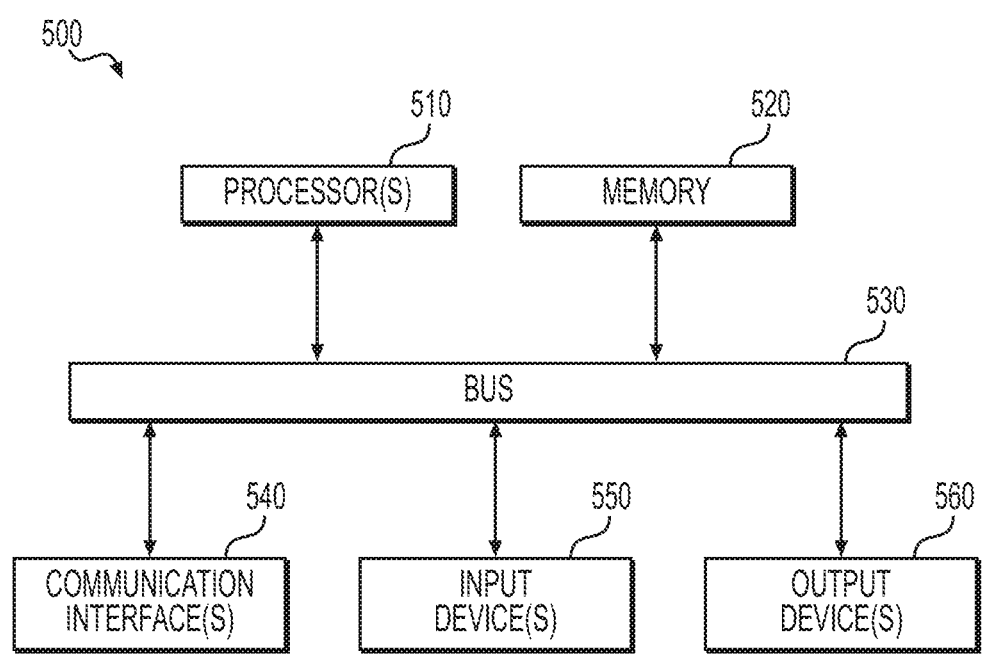
FIG. 5 depicts an example of a computing device, according to one or more embodiments.

FIG. 5 illustrates an example of a computing device 500 of a computer system, such as computer system 110. The computing device 500 may include processor(s) 510 (e.g., CPU, GPU, or other such processing unit(s)), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560

(e.g., a display, printer). The aforementioned elements of the computing device 500 may be connected to one another through a bus 530, which represents one or more busses. In some embodiments, the processor(s) 510 of the computing device 500 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for predicting improved operating hours for a merchant, the method comprising:
    monitoring payment transaction data of a target merchant, the payment transaction data received from a physical payment processing system located at the target merchant;
    determining, via one or more processors, operating hours of the target merchant based on a cessation of payment transactions at the physical payment processing system not within the operating hours;
    determining, via the one or more processors, consumer traffic data based on GPS signals from consumer mobile devices during a period of time not within the operating hours, anonymizing the consumer traffic data to disassociate personal identities, and correlating the consumer traffic data to the target merchant;
    identifying, via a first trained machine learning model, one or more merchants other than the target merchant, wherein:
        the first trained machine learning model is trained by supervised learning using an effectiveness of past matches between past other merchants and past target merchants to identify the one or more merchants other than the target merchant;
        the one or more merchants other than the target merchant are output by the first trained machine learning model based on receiving target merchant characteristics and consumer traffic data based on the GPS signals as inputs;
        the first trained machine learning model outputs the one or more merchants other than the target merchant based at least on satisfaction of one or more selection criteria pertaining to relevance to the target merchant, the selection criteria based on the target merchant characteristics and comprising a supplement of a product sold by the target merchant; and
        the first trained machine learning model outputs the one or more merchants other than the target merchant further based on the consumer traffic data based on the GPS signals;
    obtaining, via the one or more processors, transactional data indicating customer transactions at the one or more merchants other than the target merchant identified by the first trained machine learning model, the customer transactions including customer transactions during the period of time not within the operating hours;
    identifying other merchant locations of the one or more merchants other than the target merchant;
    determining, via the one or more processors, other merchant consumer traffic data for the one or more merchants other than the target merchant based on the other merchant locations and GPS signals from consumer mobile devices during the period of time not within the operating hours;
    inputting, to a second trained machine learning model, input data including the obtained transactional data, the consumer traffic data, and, the other merchant consumer traffic data, the obtained transactional data including a particular period of time associated with the customer transactions at the one or more merchants other than the target merchant;
    computing, via the one or more processors, an estimate of potential customer transactions at the target merchant during the period of time not within the operating hours by processing the input data using the second trained machine learning model to produce the estimate, the estimate being a number or value of consumer transactions missed as a result of the target merchant being closed during the period of time not within the operating hours;

determining, via the one or more processors, whether a trigger condition has occurred, the trigger condition including a passage of a predetermined period of time;

determining that the trigger condition has occurred and transmitting, to a device associated with the target merchant, information indicating the computed estimate of potential customer transactions at the target merchant during the period of time not within the operating hours based on the determination that the trigger condition occurred to regulate a frequency at which the information is transmitted;

monitoring receipt of a new customer transaction at the physical payment processing system during the period of time not within the operating hours;

modifying the operating hours to include at least a portion of the period of time not within the operating hours based on the receipt of the new customer transaction; and modifying the first trained machine learning model based on the modified operating hours.

2. The method of claim 1, wherein the input data further includes target merchant transactional data indicating customer transactions at the target merchant.

3. The method of claim 1, wherein the one or more merchants other than the target merchant offer a product a type that is a complement to a type of product offered by the target merchant.

4. The method of claim 1, wherein the input data further includes at least one of weather data or a schedule of holidays.

5. The method of claim 1, wherein the input data includes consumer location data indicating persons being located in a geographical area of the target merchant during the period of time.

6. The method of claim 1, wherein the estimate is the number of consumer transactions missed as a result of the target merchant being closed during the period of time.

7. The method of claim 1, wherein the estimate is the value of consumer transactions missed as a result of the target merchant being closed during the period of time.

8. The method of claim 1, wherein the input data includes operating cost data associated with the target merchant, the operating cost data being received from one or more systems external to the target merchant, and wherein the estimate of potential customer transactions at the target merchant during the period of time not within the operating hours is determined with the second trained machine learning model as a function of the operating cost data.

9. The method of claim 1, wherein the cessation of payment transactions outside the operating hours are determined based on transactional data from a card transaction device.

10. The method of claim 1, further comprising determining a recommended staffing level for the period of time not within the operating hours by processing the input data, wherein the recommended staffing level corresponds to a threshold amount of profit during the period of time not within the operating hours.

11. The method of claim 1, further comprising training the second trained machine learning model to output an estimate of potential customer transactions at the target merchant during the period of time not within the operating hours based on a training set comprising one or more of the data indicating one or more characteristics of merchants in the set of merchants, data indicating characteristics of respective geographical locations of the merchants in the set of merchants, data indicating weather at the merchant location over a period of time, or a merchant schedule of holidays; and generating the second trained machine learning model based on the training the second trained machine learning model.

12. A computer system for predicting improved operating hours for a merchant, comprising:

a memory storing instructions; and one or more processors configured to execute the instructions to perform operations including:

monitoring payment transaction data of a target merchant, the payment transaction data received from a physical payment processing system located at the target merchant;

determining operating hours of the target merchant based on a cessation of payment transactions at the physical payment processing system not within the operating hours;

determining, via the one or more processors, consumer traffic data based on GPS signals from consumer mobile devices during a period of time not within the operating hours, anonymizing the consumer traffic data to disassociate personal identities, and correlating the consumer traffic data to the target merchant;

identifying via a first trained machine learning model, one or more merchants other than the target merchant, wherein:

the first trained machine learning model is trained by supervised learning using an effectiveness of past matches between past other merchants and past target merchants to identify the one or more merchants other than the target merchant;

the one or more merchants other than the target merchant are output by the first trained machine learning model based on receiving target merchant characteristics and consumer traffic data based on the GPS signals as inputs;

the first trained machine learning model outputs the one or more merchants other than the target merchant based at least on satisfaction of one or more selection criteria pertaining to relevance to the target merchant, the selection criteria based on the target merchant characteristics and comprising a supplement of a product sold by the target merchant; and;

the first trained machine learning model outputs the one or more merchants other than the target merchant further based on the consumer traffic data based on the GPS signals;

obtaining transactional data indicating customer transactions at the one or more merchants other than the target merchant identified by the first trained machine learning model, the customer transactions including customer transactions during the period of time not within the operating hours;

identifying other merchant locations of the one or more merchants other than the target merchant;

determining, via the one or more processors, other merchant consumer traffic data for the one or more merchants other than the target merchant based on the other merchant locations and GPS signals from consumer mobile devices during the period of time not within the operating hours;

inputting, to a second trained machine learning model, input data including the obtained transactional data, the consumer traffic data, and, the other merchant consumer traffic data, the obtained transactional data including a particular period of time associated with the customer transactions at the one or more merchants other than the target merchant;

by using the second trained machine learning model, computing an estimate of potential customer transactions at the target merchant during the period of time not within the operating hours based on the input data, and determining one or more operating recommendations, the estimate being a number or value of consumer transactions missed as a result of the target merchant being closed during the period of time not within the operating hours, the one or more operating recommendations including a recommendation regarding an adjustment to the operating hours based on the computed estimate;

determining whether a trigger condition has occurred, the trigger condition including a passage of a predetermined period of time;

determining that the trigger condition has occurred and transmitting, to a device associated with the target merchant, information indicating the determined one or more operating recommendations based on the determination that the trigger condition occurred so as to regulate a frequency at which the information is transmitted;

monitoring receipt of a new customer transaction at the physical payment processing system during the period of time not within the operating hours; and modifying the operating hours to include at least a portion of the period of time not within the operating hours based on the receipt of the new customer transaction; and modifying the first trained machine learning model based on the modified operating hours.

13. The computer system of claim 12, wherein
the recommendation regarding the adjustment to the operating hours is a recommendation to include the period of time in the operating hours, and
the one or more operating recommendations further includes a recommended staffing level for the period of time.

14. The computer system of claim 12, wherein
the operations further include determining operating costs of the target merchant, and
the determined one or more operating recommendations is further based on the operating costs.

15. The computer system of claim 12, wherein the input data further includes target merchant transactional data indicating customer transactions at the target merchant, at least one of weather data and a schedule of holidays, and/or data indicating persons being located in a geographical location associated with the target merchant during the period of time.

16. The computer system of claim 12, wherein
the estimate is the number of consumer transactions missed as a result of the target merchant being closed during the period of time, and
the information indicating the determined one or more operating recommendations further indicates the estimate.

17. The computer system of claim 12, wherein
the estimate is the value of consumer transactions missed as a result of the target merchant being closed during the period of time, and
the information indicating the determined one or more operating recommendations further indicates the estimate.

18. A computer system for predicting improved operating hours for a merchant, comprising:
a memory storing instructions; and
one or more processors configured to execute the instructions to perform operations including:
receiving monitored payment transaction data of a target merchant, the payment transaction data received from a physical payment processing system located at the target merchant;
receiving, from a target merchant over a computer network, information indicating operating hours of the target merchant based on a cessation of payment transactions at the physical payment processing system not within the operating hours and receiving one or more characteristics of the target merchant;
determining, via the one or more processors, consumer traffic data based on GPS signals from consumer mobile devices during a period of time not within the operating hours, anonymizing the consumer traffic data to disassociate personal identities, and correlating the consumer traffic data to the target merchant;
identifying via a first trained machine learning model, one or more merchants, other than the target merchant, wherein:
the first trained machine learning model is trained by supervised learning using an effectiveness of past matches between past other merchants and past target merchants to identify the one or more merchants other than the target merchant;
the one or more merchants other than the target merchant are output by the first trained machine learning model based on receiving target merchant characteristics and consumer traffic data based on the GPS signals as inputs;
the first trained machine learning model outputs the one or more merchants other than the target merchant based at least on satisfaction of one or more selection criteria pertaining to relevance to the target merchant, the selection criteria based on the target merchant characteristics and comprising a supplement of a product sold by the target merchant; and
the first trained machine learning model outputs the one or more merchants other than the target merchant further based on the consumer traffic data based on the GPS signals;
obtaining transactional data indicating customer transactions at the one or more merchants other than the target merchant identified by the first trained machine learning model, the customer transactions including customer transactions during a period of time not within the operating hours;
identifying other merchant locations of the one or more merchants other than the target merchant;
determining, via the one or more processors, other merchant consumer traffic data for the one or more merchants other than the target merchant based on the other merchant locations and GPS signals from consumer mobile devices during the period of time not within the operating hours;
inputting, to a second trained machine learning model, input data including the obtained transactional data, the consumer traffic data, and, the other merchant consumer traffic data, the obtained transactional data including a particular period of time associated with the customer transactions at the one or more merchants other than the target merchant;
computing an estimate of potential customer transactions at the target merchant during the period of time not within the operating hours, by processing the input data using the second trained machine learning model, the estimate being a number or value of consumer transactions missed as a result of the target merchant being closed during the period of time not within the operating hours;
determining whether a trigger condition has occurred, the trigger condition including a passage of a predetermined period of time;
determining that the trigger condition has occurred and transmitting, to a device associated with the target merchant over the computer network, a recommendation regarding an adjustment to the operating hours generated based on the computed estimate of potential customer transactions at the target merchant during the determined period of time not within the operating hours and the determination that the trigger condition occurred so as to regulate a frequency at which the information is transmitted
monitoring receipt of a new customer transaction at the physical payment processing system during the period of time not within the operating hours; and
modifying the operating hours to include at least a portion of the period of time not within the operating hours based on the receipt of the new customer transaction; and
modifying the first trained machine learning model based on the modified operating hours.

* * * * *